US008775543B2

(12) United States Patent
Yibin et al.

(10) Patent No.: US 8,775,543 B2
(45) Date of Patent: Jul. 8, 2014

(54) METHODS, APPARATUSES, AND COMPUTER PROGRAM PRODUCTS FOR ANALYZING COMMUNICATION RELATIONSHIPS

(75) Inventors: Zhang Yibin, Beijing (CN); Wang Xia, Beijing (CN); Song Zhanjiang, Beijing (CN); Guo Jun, Beijing (CN)

(73) Assignee: Nokia Corporation, Espoo (FI)

( * ) Notice: Subject to any disclaimer, the term of this patent is extended or adjusted under 35 U.S.C. 154(b) by 199 days.

(21) Appl. No.: 12/119,947

(22) Filed: May 13, 2008

(65) Prior Publication Data

US 2009/0287813 A1 Nov. 19, 2009

(51) Int. Cl.
*G06F 15/16* (2006.01)

(52) U.S. Cl.
USPC .......................................... 709/207; 709/206

(58) Field of Classification Search
CPC .................................................. H04L 61/1594
USPC .................................................. 709/206–207
See application file for complete search history.

(56) References Cited

U.S. PATENT DOCUMENTS

| | | | | |
|---|---|---|---|---|
| 5,768,360 A | * | 6/1998 | Reynolds et al. | 379/211.02 |
| 5,918,213 A | * | 6/1999 | Bernard et al. | 705/26 |
| 6,473,499 B1 | * | 10/2002 | Ng et al. | 379/121.02 |
| 7,042,992 B1 | * | 5/2006 | Falcone et al. | 379/114.21 |
| 7,194,536 B2 | * | 3/2007 | Fellenstein et al. | 709/224 |
| 7,203,523 B2 | * | 4/2007 | Ito | 455/567 |
| 7,313,827 B2 | * | 12/2007 | Kelley et al. | 726/28 |
| 7,389,324 B2 | * | 6/2008 | Masonis et al. | 709/206 |
| 7,586,418 B2 | * | 9/2009 | Cuddihy et al. | 340/573.1 |
| 7,590,232 B2 | * | 9/2009 | Carter et al. | 379/209.01 |
| 7,620,428 B2 | * | 11/2009 | Aoike | 455/567 |
| 7,653,417 B2 | * | 1/2010 | Morota et al. | 455/565 |
| 7,760,861 B1 | * | 7/2010 | Croak et al. | 379/114.14 |
| 7,764,951 B2 | * | 7/2010 | Patel et al. | 455/414.1 |
| 7,805,488 B2 | * | 9/2010 | McCuller | 709/206 |
| 8,280,913 B2 | * | 10/2012 | Bergin | 707/793 |
| 8,457,300 B2 | * | 6/2013 | Hemm et al. | 379/266.01 |
| 2001/0026609 A1 | * | 10/2001 | Weinstein et al. | 379/93.01 |
| 2002/0123368 A1 | * | 9/2002 | Yamadera et al. | 455/556 |
| 2002/0188497 A1 | * | 12/2002 | Cerwin | 705/10 |
| 2003/0054864 A1 | * | 3/2003 | Mergler | 455/566 |
| 2004/0081305 A1 | * | 4/2004 | Gonzalez et al. | 379/207.16 |
| 2004/0214568 A1 | * | 10/2004 | Anderson | 455/426.1 |
| 2005/0289231 A1 | * | 12/2005 | Harada et al. | 709/224 |
| 2006/0052091 A1 | * | 3/2006 | Onyon et al. | 455/415 |
| 2006/0224675 A1 | * | 10/2006 | Fox et al. | 709/206 |
| 2006/0259434 A1 | * | 11/2006 | Vilcauskas et al. | 705/57 |
| 2007/0123204 A1 | * | 5/2007 | Inukai | 455/403 |
| 2007/0132576 A1 | * | 6/2007 | Kolavennu et al. | 340/539.13 |
| 2007/0161412 A1 | * | 7/2007 | Nevid et al. | 455/567 |
| 2007/0165554 A1 | * | 7/2007 | Jefferson et al. | 370/315 |
| 2007/0165609 A1 | * | 7/2007 | Corvoysier et al. | 370/356 |
| 2007/0165821 A1 | * | 7/2007 | Altberg et al. | 379/210.02 |
| 2007/0174432 A1 | | 7/2007 | Rhee et al. | |
| 2007/0244988 A1 | * | 10/2007 | Tsai | 709/217 |

(Continued)

*Primary Examiner* — Tauqir Hussain
*Assistant Examiner* — Angela Widhalm
(74) *Attorney, Agent, or Firm* — Alston & Bird LLP

(57) ABSTRACT

An apparatus may include a processor configured to store a record of communications with a remote device. The processor may be further configured to calculate one or more values representative of a communication relationship with the remote device over a period of time based at least in part upon the stored record of communications. The processor may be additionally configured to determine a communication relationship pattern based upon the one or more calculated values.

25 Claims, 6 Drawing Sheets

(56) References Cited

U.S. PATENT DOCUMENTS

| | | | |
|---|---|---|---|
| 2007/0263843 A1* | 11/2007 | Foxenland | 379/355.02 |
| 2007/0266156 A1* | 11/2007 | Wilkins | 709/225 |
| 2007/0293211 A1* | 12/2007 | Yang et al. | 455/420 |
| 2008/0003964 A1* | 1/2008 | Alperin et al. | 455/185.1 |
| 2008/0084975 A1* | 4/2008 | Schwartz | 379/88.22 |
| 2008/0299959 A1* | 12/2008 | Geyer et al. | 455/418 |
| 2009/0010410 A1* | 1/2009 | Anderson et al. | 379/201.01 |
| 2009/0131028 A1* | 5/2009 | Horodezky et al. | 455/418 |
| 2009/0150373 A1* | 6/2009 | Davis et al. | 707/5 |
| 2009/0170532 A1* | 7/2009 | Lee et al. | 455/456.3 |
| 2009/0245484 A1* | 10/2009 | Bates | 379/88.19 |
| 2009/0257576 A1* | 10/2009 | Wellard et al. | 379/201.03 |
| 2009/0270067 A1* | 10/2009 | Johnson | 455/405 |
| 2010/0046731 A1* | 2/2010 | Gisby et al. | 379/211.01 |

* cited by examiner

METHODS, APPARATUSES, AND COMPUTER PROGRAM PRODUCTS FOR ANALYZING COMMUNICATION RELATIONSHIPS

TECHNOLOGICAL FIELD

Embodiments of the present invention relate generally to mobile communication technology and, more particularly, relate to methods, apparatuses, and computer program products for analyzing communication relationships with users of remote computing devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the convenience to users is analyzing communication relationships of a user with users of remote computing devices. In this regard, our communication relationships with different people are different. For example, we may have frequent and balanced communication relationships with some persons, wherein communications occur both frequently and there is a relative balance between a number of incoming and outgoing communications with such a person. Contrastingly, with other persons, communications may occur infrequently and/or may be unbalanced such that one person initiates the majority of communications in the relationship. Such communication relationships are not static and may evolve over time. Sometimes, such as due to busy lives, however, people may ignore or simply be unaware of evolutions in communication relationships with their personal and business contacts. Old friends may slowly become strangers and by the point a user realizes that he has lost contact with an old friend, it may be difficult to rectify the relationship.

Some mobile devices may currently display a listing of recent calls and messages received and sent by the mobile device, but such listings are often organized merely in a chronological order and may not provide any ready indication to a device user of his communication relationship patterns with users of remote devices. While some devices may provide some further information such as total conversation time and a number of messages exchanged with a contact or a conversation time ranking of contacts, such information does not readily provide users with an indication of a communication relationship pattern with the contact. Users may not have time to monitor such communications records and extrapolate communication behaviors due to our often hectic life schedules. Accordingly, it may be advantageous to provide computing device users with methods, apparatuses, and computer program products for analyzing communication relationships between the user's computing device and users of remote computing devices, which may address some of the problems discussed above.

BRIEF SUMMARY

A method, apparatus, and computer program product are therefore provided to enable analyzing communication relationships. In particular, a method, apparatus, and computer program product are provided to enable, for example, the determination of a communication relationship pattern with users of remote devices. In some embodiments, a user of a device may be provided with an indication of the determined communication relationship pattern.

In one exemplary embodiment, a method is provided which may include storing a record of communications with a remote device. The method may further include calculating one or more values representative of a communication relationship with the remote device over a period of time based at least in part upon the stored record of communications. The method may additionally include determining a communication relationship pattern based upon the one or more calculated values.

In another exemplary embodiment, a computer program product is provided. The computer program product includes at least one computer-readable storage medium having computer-readable program code portions stored therein. The computer-readable program code portions include first, second, and third program code portions. The first program code portion is for storing a record of communications with a remote device. The second program code portion is for calculating one or more values representative of a communication relationship with the remote device over a period of time based at least in part upon the stored record of communications. The third program code portion is for determining a communication relationship pattern based upon the one or more calculated values.

In another exemplary embodiment, an apparatus is provided, which may include a processor. The processor may be configured to store a record of communications with a remote device. The processor may be further configured to calculate one or more values representative of a communication relationship with the remote device over a period of time based at least in part upon the stored record of communications. The processor may be additionally configured to determine a communication relationship pattern based upon the one or more calculated values.

In another exemplary embodiment, an apparatus is provided. The apparatus may include means for storing a record of communications with a remote device. The apparatus may further include means for calculating one or more values representative of a communication relationship with the remote device over a period of time based at least in part upon the stored record of communications. The apparatus may additionally include means for determining a communication relationship pattern based upon the one or more calculated values.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
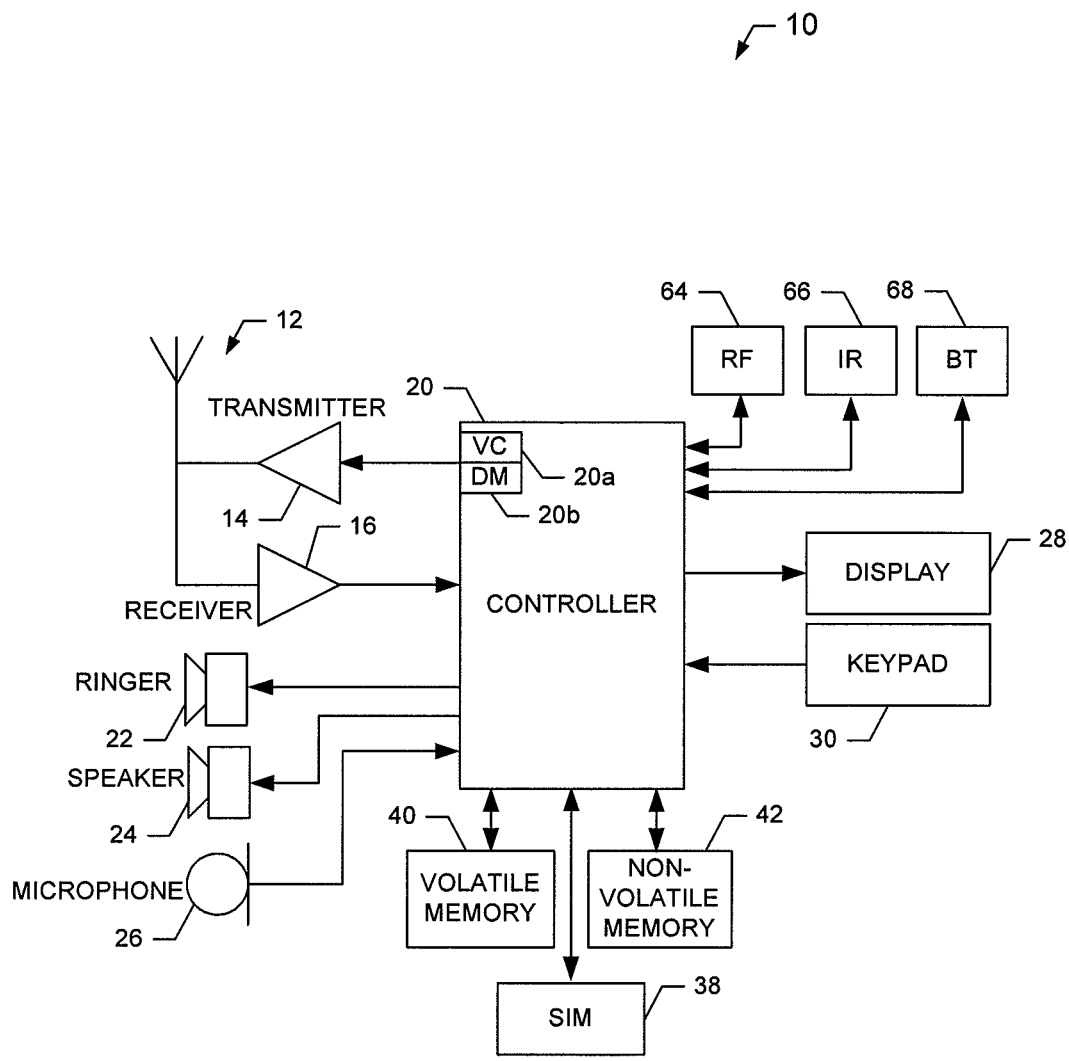
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from embodiments of the present invention. It should be understood, however, that the mobile terminal illustrated and hereinafter described is merely illustrative of one type of electronic device that may benefit from embodiments of the present invention and, therefore, should not be taken to limit the scope of the present invention. While several embodiments of the electronic device are illustrated and will be hereinafter described for purposes of example, other types of electronic devices, such as portable digital assistants (PDAs), pagers, laptop computers, desktop computers, gaming devices, televisions, and other types of electronic systems, may employ embodiments of the present invention.

As shown, the mobile terminal 10 may include an antenna 12 in communication with a transmitter 14 and a receiver 16. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as UMTS, CDMA2000, WCDMA and TD-SCDMA. The mobile terminal may be additionally capable of operating in accordance with 3.9G wireless communication protocols such as LTE or E-UTRAN. Additionally, for example, the mobile terminal may be capable of operating in accordance with fourth-generation (4G) wireless communication protocols or the like as well as similar wireless communication protocols that may be developed in the future.

Some NAMPS, as well as TACS, mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 2:
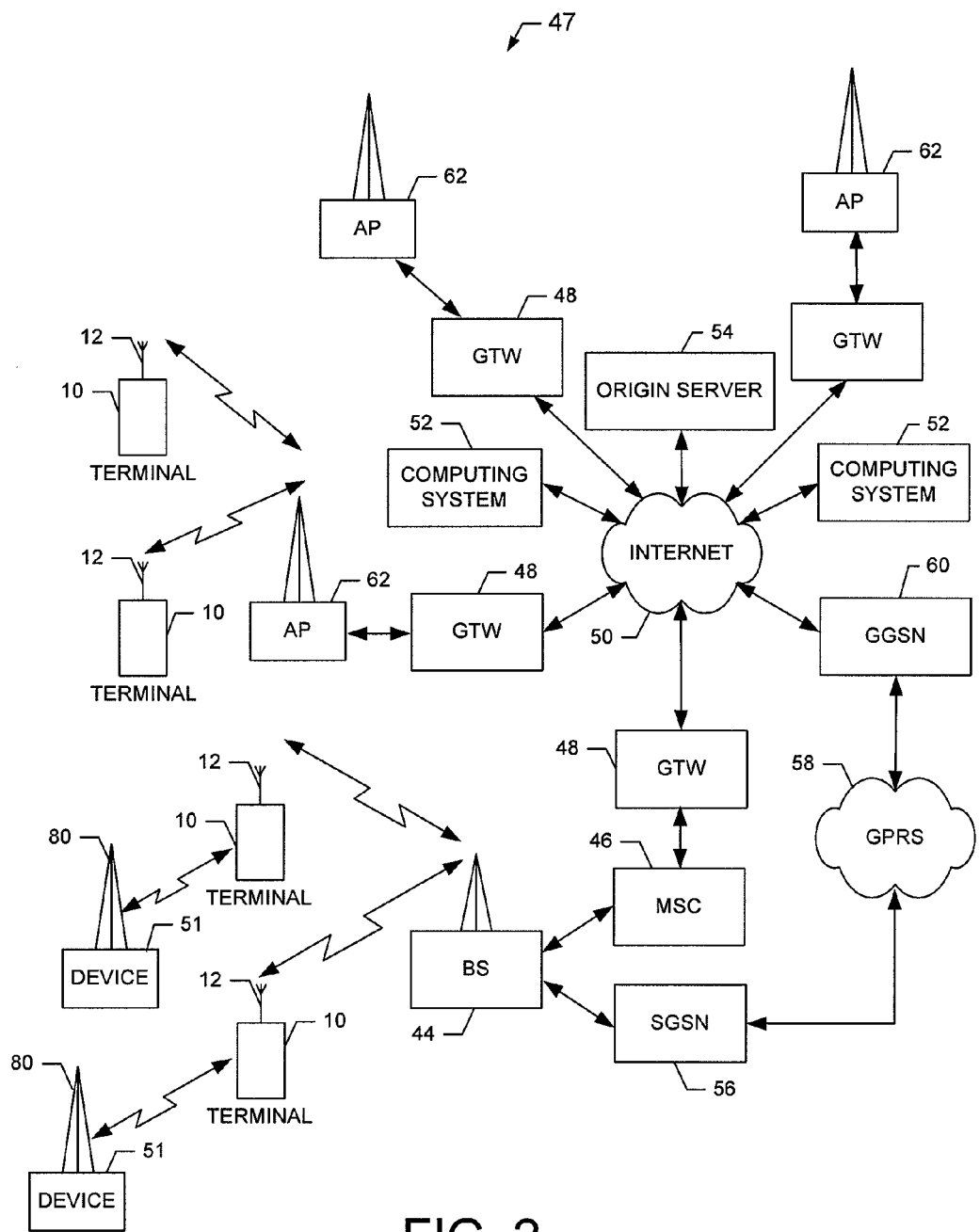
FIG. 2 is a schematic block diagram of a wireless communications system according to an exemplary embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one typical embodiment, however, the MSC 46 may be coupled to a GTW 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as E-UTRAN or a Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 52 may additionally, or alternatively, include a removable memory capable of storing content, which can thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 may comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, wireless accessories, appliances, portable digital assistants (PDAs), pagers, laptop computers, motion sensors, light switches and other types of electronic devices.

Figure 3:
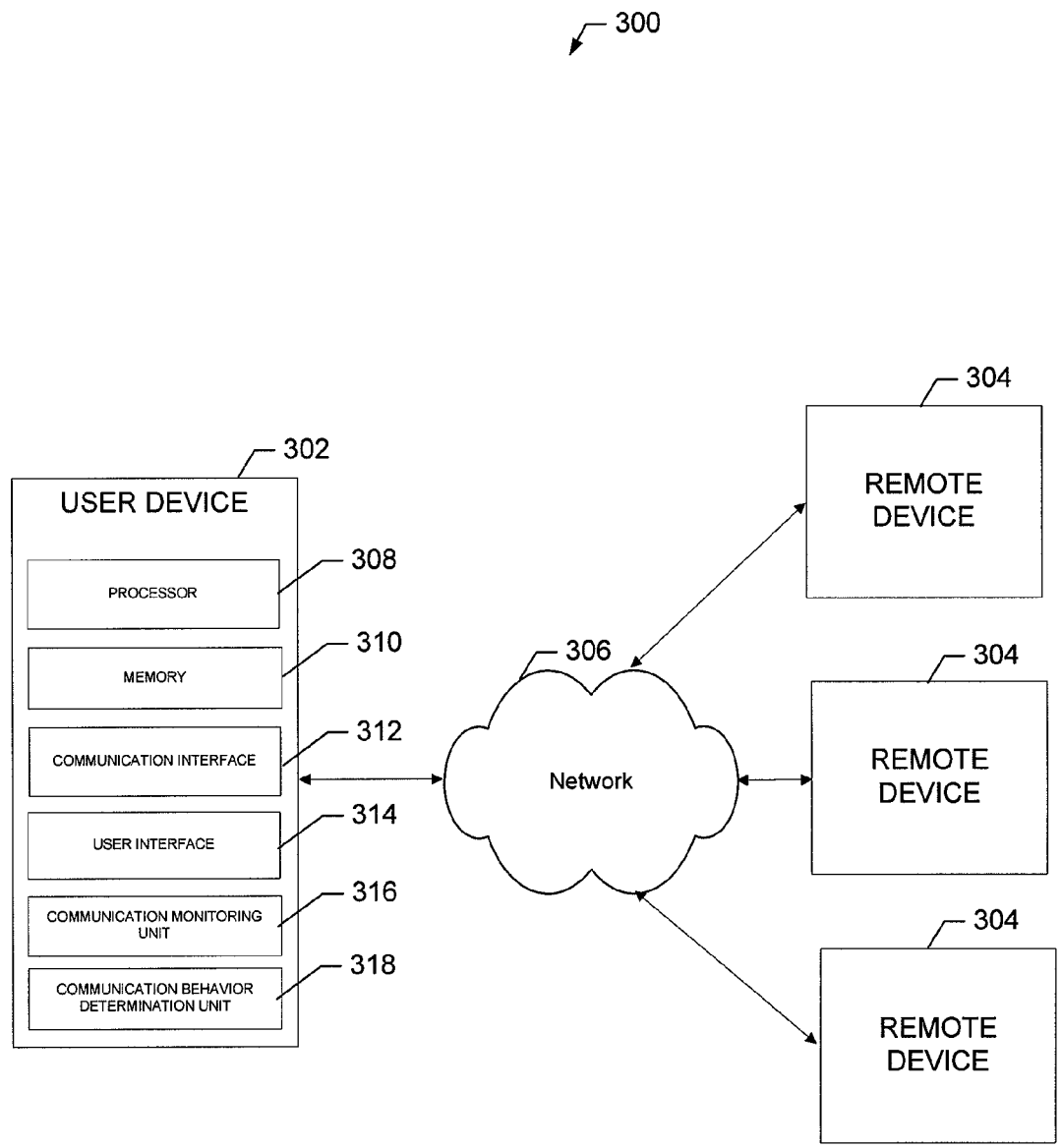
FIG. 3 illustrates a block diagram of a system for analyzing communication relationships according to an exemplary embodiment of the present invention.

FIG. 3 illustrates a block diagram of a system 300 for analyzing communication relationships according to an exemplary embodiment of the invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. The system 300 will be described, for purposes of example, in connection with the mobile terminal 10 of FIG. 1 and the system 47 of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1. Further, it should be noted that the system of FIG. 3 may be used in connection with any of a variety of network configurations or protocols and is not limited to embodiments using aspects of the system 47 of FIG. 2. It should also be noted, that while FIG. 3 illustrates one example of a configuration of a system for analyzing communication relationships, numerous other configurations may also be used to implement embodiments of the present invention.

Referring now to FIG. 3, the system 300 may include a user device 302 and a plurality of remote devices 304 configured to communicate with each other over a network 306. The user device 302 and remote devices 304 may be any computing device capable of communicating with other computing devices. In an exemplary embodiment, one or both of the user device 302 and remote devices 304 may be mobile terminals 10. The network 306 may be any network over which a user device 302 and remote device 304 are configured to communicate. Accordingly, the network 306 may be a wireless or wireline network and in an exemplary embodiment may be the system 47 of FIG. 2.

The user device 302 may include various means, such as a processor 308, memory 310, communication interface 312, user interface 314, communication monitoring unit 316, and communication behavior determination unit 318 for performing the various functions. The processor 308 may be embodied in a number of different ways. For example, the processor 308 may be embodied as a microprocessor, a coprocessor, a controller, or various other processing elements including integrated circuits such as, for example, an ASIC (application specific integrated circuit) or FPGA (field programmable gate array). In an exemplary embodiment, the processor 308 may be configured to execute instructions stored in the memory 310 or otherwise accessible to the processor 308.

The memory 310 may include, for example, volatile and/or non-volatile memory. The memory 310 may accordingly be embodied as volatile memory 40 or non-volatile memory 42 of a mobile terminal 10. The memory 310 may be configured to store information, data, applications, instructions, or the like for enabling the user device 302 to carry out various functions in accordance with exemplary embodiments of the present invention. For example, the memory 310 may be configured to buffer input data for processing by the processor 308. Additionally or alternatively, the memory 310 may be configured to store instructions for execution by the processor 308. As yet another alternative, the memory 310 may comprise one of a plurality of databases that store information in the form of static and/or dynamic information, for example, in association with mobile terminal context information, internet service context information, user status indicators, user activities, or the like. In this regard, the memory 310 may store, for example, data records describing and/or associated with communication events occurring between the user device 302 and remote device 304. The memory 310 may additionally store a list of contacts of the user of the user device 302, also herein referred to as a "contacts list." This stored information may be stored and/or used by the communication monitoring unit 316 and/or communication behavior determination unit 318 during the course of performing their respective functionalities.

The communication interface 312 may be embodied as any device or means embodied in hardware, software, firmware, or a combination thereof that is configured to receive and/or transmit data from/to a network and/or any other device or module in communication with the user device 302. The communication interface 312 may be at least partially embodied as or otherwise controlled by the processor 308. In this regard, the communication interface 312 may include, for example, an antenna, a transmitter, a receiver, a transceiver and/or supporting hardware or software for enabling communications with other entities of the system 300, such as remote devices 304 via the network 306. In this regard, the communication interface 312 may be in communication with the memory 310, user interface 314, communication monitoring unit 316, and/or communication behavior determination unit 318. The communication interface 312 may enable the receipt and transmission of communications with remote devices 304. As used herein, "communications" and "communication events" may be used interchangeably and may include, but are not limited to, phone calls, short message service (SMS) messages, multimedia messaging service (MMS) messages, instant messages (IM), e-mails, and transfer or other sharing of files between a user device 302 and a remote device 304. Sometimes herein, the generic term "messages" may be used to refer to SMS messages, MMS messages, instant messages, e-mails, file transfers, and other similar modes of communications.

The user interface 314 may be in communication with the processor 308 to receive an indication of a user input and/or to provide an audible, visual, mechanical, or other output to the user. As such, the user interface 314 may include, for example, a keyboard, a mouse, a joystick, a touch screen display, a conventional display, a microphone, a speaker, and/or other input/output mechanisms. User input received by the user interface 314 may include, but is not limited to, initiation of communications with a remote device 304 and responses to communications received from a remote device 304. Outputs provided to the user may include indications of communication relationship patterns with a user of a remote device 304. These indications may be audio and/or visual. For example, the user interface 314 may provide a visual output indicative of a communication relationship on a display of the user device 302, such as a display 28 of a mobile terminal 10. Further, for example, the user interface 314 may provide a user with an audio output over a speaker of the user device 302, such as a speaker 24 or ringer 22 of a mobile terminal 10, indicative of a communication relationship with a user of a remote device 304 upon receipt of a communication from the remote device 304. Accordingly, the user interface 314 may provide means for providing an indication of a determined communication relationship pattern to a user.

The communication monitoring unit 316 may be embodied as hardware, software, firmware, or some combination thereof and may be embodied as or otherwise controlled by the processor 308. In embodiments where the communication monitoring unit 316 is embodied separately from the processor 308, the communication monitoring unit 316 may be in communication with the processor 308. The communication monitoring unit 316 may provide means for monitoring communications with a remote device 304 and for storing a record of communications with a remote device 304. In this regard, the communication monitoring unit 316 may be configured to monitor all incoming and outgoing communications with a plurality of remote devices 304 and to store a record of such communications in memory 310. The communication monitoring unit 316 may be configured for each communication event to determine one or more of a communication type (i.e. phone call, sms message, mms message, instant message, e-mail, etc), whether the communication was incoming (i.e. received from a remote device 304) or outgoing (i.e. sent or placed to a remote device 304), a time at which the communication event occurred, a length of the communication event (if applicable), a data quantity and/or bandwidth consumption of the communication event, whether the communication event was accepted or rejected, and a remote device 304 with which the communication event occurred. In this regard, an accepted communication event may be a phone call between a user device 302 and remote device 304 which was answered by the receiving device and thus has a length of time greater than 0 seconds. A rejected communication event may be a phone call between a user device 302 and remote device 304 which was not answered by the receiving party either due to missing the phone call or due to purposely ignoring the phone call and thus has an identical start and end time and thus a total call length of 0 seconds. In some embodiments, if a communication event is rejected, the communication monitoring unit 316 may be further configured to calculate and store, such as in memory 310, an interval of time comprising the length of time between the time of the rejected communication event received from a remote device 304 and the time at which a user of the user device 302 initiates a return communication event directed to the same remote device 304. This interval of time is referred to as a "delay interval."

The communication monitoring unit 316 may be configured to store a record of each communication event. Such a record may comprise at least some of the above-mentioned information that may be determined about the communication event. For example, the communication monitoring unit 316 may be configured to store records of communication events in association with a remote device 304 and/or a user of a remote device 304. Such records may be stored, for example, in association with a contact in a contacts list of the user device 302, phone number, media access control (MAC) address, IP address, and/or e-mail address associated with the remote device 304. In this regard, the communication monitoring unit 316 may be configured, for example, to store for each contact in a contacts list of the user device 302 a plurality of listings (also referred to as "tables" or "sheets") comprising records of communication events with the remote device 304 of the contact. The communication monitoring unit 316 may be configured to store one listing of communication events for each type of communication with the contact. For example, the communication monitoring unit 316 may be configured to store the following table of phone call communication events with a remote device 304:

TABLE 1

Sheet for recording phone calls with a remote device 304

| Number | In/Out | Accept/Reject | Start Time | End Time |
|---|---|---|---|---|
| "13511032436" | "I" | "A" | "200707121532" | "200707121547" |
| "13881103943" | "O" | "R" | "200707130902" | "200707130902" |

A table of SMS message communication events with a remote device 304 as stored by the communication monitoring unit 316 may resemble the following:

TABLE 2

Sheet for recording SMS messages with a remote device 304

| Number | Send/Receive | Time |
|---|---|---|
| "13511032436" | "S" | "200707141530" |
| "13881103943" | "R" | "200707140922" |

It will be appreciated that these two tables are merely examples, however, and the communication monitoring unit 316 may store additional or alternative information about communication events and may store the information in a variety of configurations and arrangements. Further, although in an exemplary embodiment as described above the communication monitoring unit 316 may be configured to store communication event data records locally in means, such as memory 310, the communication monitoring unit 316 may also be configured to store such data remotely, such as in various remote storage means, such as in any of the devices of FIG. 2. For that matter, the communication monitoring unit 316, itself, may be embodied in a device remote to user device 302, such as in a network device of the system 47 that is in communication with the user device 302.

The communication behavior determination unit 318 may be embodied as various means, such as hardware, software, firmware, or some combination thereof and, in one embodiment, may be embodied as or otherwise controlled by the processor 308. In embodiments where the communication behavior determination unit 318 is embodied separately from the processor 308, the communication behavior determination unit 318 may be in communication with the processor 308. The communication behavior determination unit 318 may provide means for calculating one or more values representative of a communication relationship with a remote device 304 as well as means for determining a communication relationship pattern with a remote device 304. In this regard, the communication behavior determination unit 318 may be configured to access stored communication event data, such as from memory 310, and calculate communication relationship values and determine a communication relationship pattern based upon the communication event data. The communication behavior determination unit 318 may be configured to calculate communication relationship values and determine a communication relationship pattern for each contact stored in a contacts list of the user device 302 or for a plurality of remote devices 304 with which the user device 302 has engaged in communications. These calculations and determinations may be performed automatically by the communication behavior determination unit 318, such as at regularly scheduled times or intervals, and/or may be performed in response to a user command or inquiry received by the user interface 314.

The communication behavior determination unit 318 may be configured, for example, to determine for each contact from the communication event data one or more of a length of incoming phone calls in a period of time (CI/period), a length of outgoing phone calls in a period of time (CO/period), a number of SMS messages received in a period of time (SMR/period), a number of SMS messages sent in a period of time (SMS/period), a length of messages sent in a period of time, a length of messages received in a period of time, a total bandwidth consumed by or data size of messages sent in a period of time, a total bandwidth consumed by or data size of messages received in a period of time, a ratio between a length of incoming phone calls and a length of outgoing phone calls in a period of time (RCICO/period), a ratio between a number of rejected incoming phone calls and a number of rejected outgoing phone calls in a period of time (RCIRCOR/period), a ratio between a number of incoming SMS messages and a number of outgoing SMS messages in a period of time (RSMRS/period), a maximum length of time of a single phone call (MAX Length), a minimum length of time of a single phone call (MIN Length), an average length of phone calls with the contact over a period of time (AVE Length), and a total length of all phone calls with the contact over a period of time (TOTAL Length). The communication behavior determination unit 318 may be configured to calculate a plurality of communication relationship values from these determined values. For example, the communication behavior determination unit 318 may calculate an intensity value representative of a communication intensity between the user device 302 and a remote device 304. In an exemplary embodiment, this intensity value may represent a total time length of communication events with a remote device 304 over a period of time. For example, a time length intensity value may be calculated by adding the total length of incoming and outgoing phone calls with a remote device over a period of time to a time constant multiplied by a number of SMS messages, MMS message, e-mails, and/or file shares exchanged over a period of time with the remote device 304. An exemplary formula, wherein 'X' denotes the domain of variables used in the function and 'T' denotes time, for calculating intensity as follows assigns a constant value of 20 seconds to each incoming and outgoing SMS message:

$$\text{Intensity}(X,T)=f(\text{TotalLength},\text{SMR},\text{SMS})=\text{TotalLength}+20(\text{SMR}+\text{SMS})$$

It will be appreciated that while this formula only illustrates factoring a ratio of SMS messages in intensity calculations, embodiments of the invention are not so limited and may factor in alternative or additional message communication types. In an alternative embodiment, intensity may be calculated based on a total size of data exchanged with a remote device 304 or an amount of bandwidth consumed by communication events between the user device 302 and a remote device 304. In such alternative embodiments, the communication monitoring unit 312 may store a data size for each exchanged message, such as an SMS message, NIMS message, e-mail, and/or file share. In calculating the intensity value, the communication behavior determination unit 318 may then multiply the lengths of phone call events by a data conversion constant representative of an amount of data transferred per a unit of time and add that value to the total data size for exchanged messages.

The communication behavior determination unit 318 may further be configured to calculate a balance value representative of a balance of incoming and outgoing communication events with a remote device 304. This balance value may indicate, for example, whether one party is more zealous in their communication with the other, as reflected by initiating more and/or longer communication events than the other party. In an exemplary embodiment, the balance value may be calculated as follows:

$$\text{Balance}(X,T)=f(\text{RCICO},\text{RSMRS})=a*\text{RCICO}+(1-a)*\text{RSMRS}$$

In this formula, the balance of communication events over a period of time is thus represented as a first coefficient (a) multiplied by the ratio between incoming phone call time length and outgoing phone call time lengths plus a second coefficient (1−a) multiplied by the ratio between incoming and outgoing messages. This coefficient a is a constant that may be assigned a value between 0 and 1, such as by a manufacturer of a user device 302 and/or a user of a user device 302, to reflect the relative importance of different communication types. In an exemplary embodiment where messages and phone calls are of relatively equal importance, a may be set to a value of 0.5. It will be appreciated that while this formula only illustrates factoring a ratio of SMS messages in balance calculations, embodiments of the invention are not so limited and may factor in alternative or additional message communication types. Although only intensity and balance calculations have been described herein, it will be appreciated that the communication behavior determination unit 318 may calculate other values based upon communication event data records.

The communication behavior determination unit 318 may be further configured to calculate a communication relationship behavior value based upon one or more of the above calculated values. In this regard, a communication relationship behavior value may be determined as a function of intensity (I), balance (B), and time (T) as follows:

$CBehavior(I,B,T) = f(Intensity(X,T), Balance(X,T))$

Figure 4:
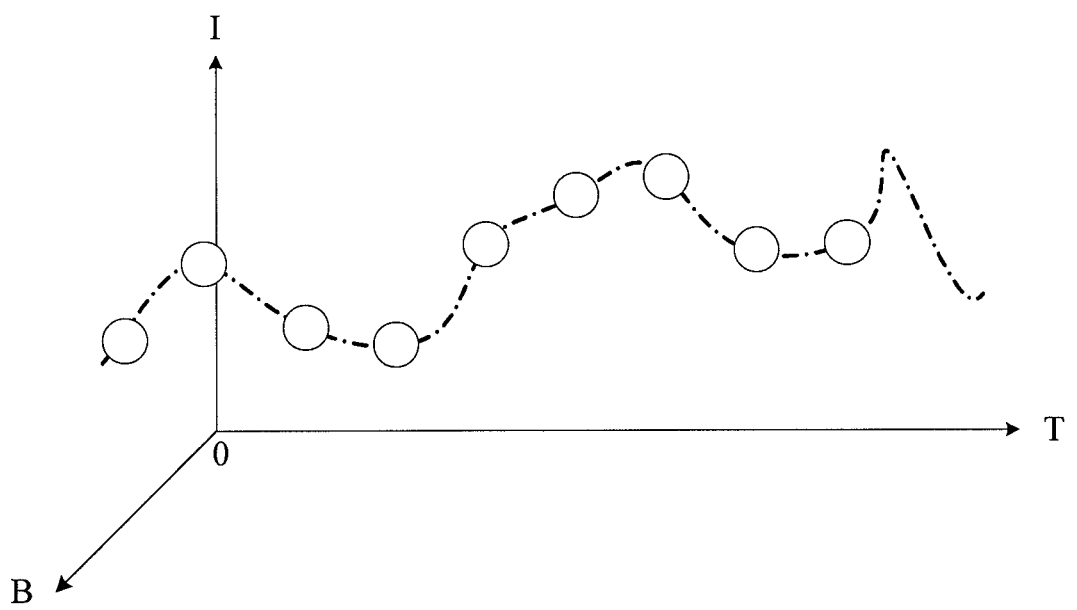
FIG. 4 illustrates a graph of a communication relationship over a period of time according to an exemplary embodiment of the present invention.

Theoretically, such a communication relationship behavior value over a period of time may be represented as a curve in the three dimension space $\Psi(I,B,T)$ as illustrated in FIG. 4. In calculating a communication relationship behavior value according to such a function, however, the communication behavior determination unit 318 may determine a single point or value for each time period for which a communication relationship behavior value is calculated.

Figure 5:
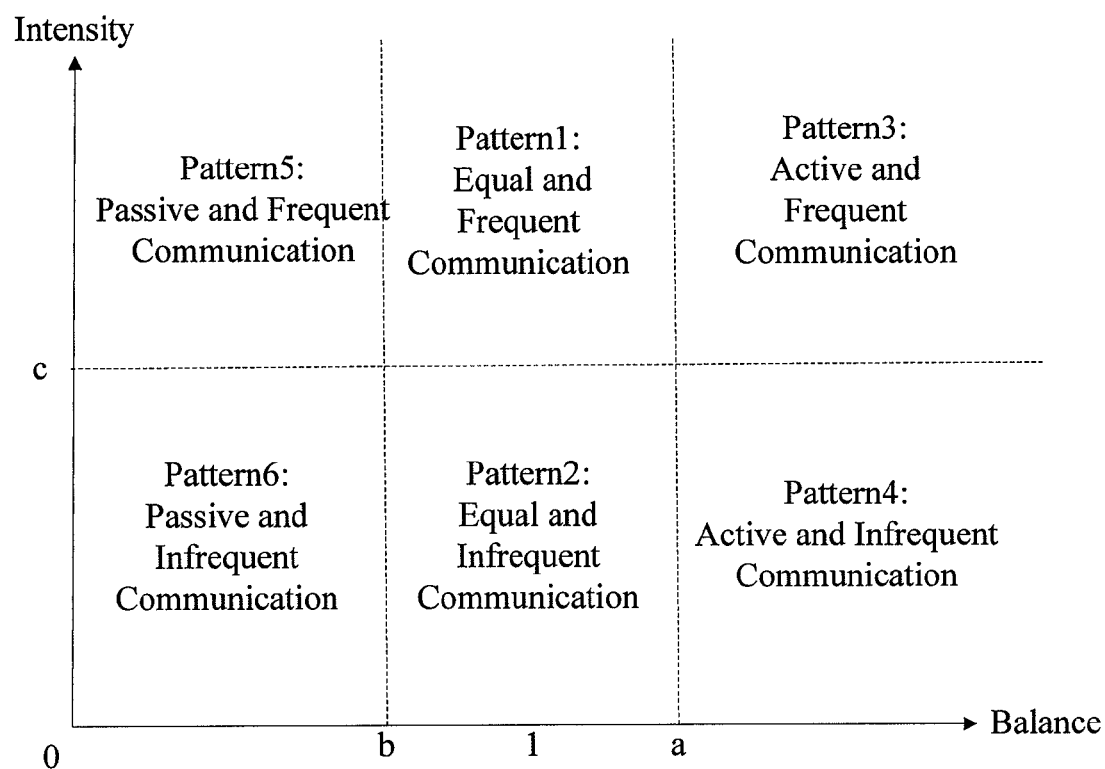
FIG. 5 illustrates a graph of communication relationship patterns according to another exemplary embodiment of the present invention.

In this regard, the communication behavior determination unit 318 may be configured to determine a communication relationship pattern from one or more of the communication relationship behavior value, intensity value, and balance value. In an exemplary embodiment, the communication behavior determination unit 318 may be configured to determine whether a communication relationship falls into one of six communication relationship patterns illustrated in FIG. 5. The six communication relationship patterns may be described as follows:

Equal and Frequent Communication — Pattern 1
$CBehavior(I, B, T) = f(Intensity(X, T),$
$Balance(X, T)) = \begin{cases} Intensity > c \\ \text{and} \\ b \leq Balance \leq a \end{cases}$ Equal and Infrequent Communication — Pattern 2
$CBehavior(I, B, T) = f(Intensity(X, T),$
$Balance(X, T)) = \begin{cases} Intensity \leq c \\ \text{and} \\ b \leq Balance \leq a \end{cases}$ Active and Frequent Communication — Pattern 3
$CBehavior(I, B, T) = f(Intensity(X, T),$
$Balance(X, T)) = \begin{cases} Intensity > c \\ \text{and} \\ Balance > a \end{cases}$ Active and Infrequent Communication — Pattern 4
$CBehavior(I, B, T) = f(Intensity(X, T),$
$Balance(X, T)) = \begin{cases} Intensity \leq c \\ \text{and} \\ Balance > a \end{cases}$ Passive and Frequent Communication — Pattern 5
$CBehavior(I, B, T) = f(Intensity(X, T),$
$Balance(X, T)) = \begin{cases} Intensity > c \\ \text{and} \\ Balance < b \end{cases}$ Passive and Infrequent Communication — Pattern 6
$CBehavior(I, B, T) = f(Intensity(X, T),$
$Balance(X, T)) = \begin{cases} Intensity \leq c \\ \text{and} \\ Balance < b \end{cases}$ In these patterns, "passive" denotes relationships where the number of incoming communications is at least somewhat significantly greater than the number of outgoing communications with the contact. Contrastingly, "active" denotes relationships where the number of outgoing communications is at least somewhat significantly greater than the number of incoming communications with the contact. The values of the constants a, b, and c may be determined in a variety of ways. In one embodiment, the values may be provided by a user of the user device 302 according to his own customized needs and desires for analyzing communication relationships. However, all three constants are assigned values greater than 0 and the constant c is associated with a unit of time. In two alternative embodiments, the values of the three constants may be assigned automatically and updated as communication relationship patterns of the contacts stored in the user device 302 evolve. In a first such alternative embodiment, the constant c may be assigned a value equivalent to the average intensity value for all contacts stored in the user device 302. The values of a and b may be determined by ordering the balance values for all contacts from lowest to highest and assigning b the value of the average balance of a plurality of contacts falling into a lowest balance percentile and assigning a the value of the average balance of a plurality of contacts falling into a highest balance percentile. In a second such alternative embodiment, the constants a, b, and c may be assigned values equivalent to the same values for one or more reference contacts. In this regard, a user may regard a certain contact(s) as his model communication relationship and compare communication relationship patterns with all other contacts to this model communication relationship.

In some embodiments, the communication behavior determination unit 318 may be configured to determine additional communication relationship patterns based upon a time at which the majority of communication events with a contact occur. For example, if the majority of communication events occur during business hours, the communication behavior determination unit 318 may determine the communication relationship pattern to be a business communication relationship. If, on the other hand, the majority of communication events occur during non-business hours, the communication behavior determination unit 318 may determine the communication relationship pattern to be a personal communication relationship. The business/personal communication relationship pattern may be combined with the above mentioned six communication relationship patterns to provide further information about a communication relationship. For example, the communication behavior determination unit 318 may determine a communication relationship pattern to be "Active, Frequent, and Personal Communication." As it will be appreciated that business hours may vary from one user to another, the communication behavior determination unit 318 may be configured to receive a configuration setting from a user of the user device 302 defining the user's normal hours of conducting business.

It will be appreciated that determined communication relationship patterns may be utilized in a variety of ways to benefit a user of the user device 302. For example, the user interface 314 may provide communication relationship pattern indicators in association with contact entries in the user's contacts list. These indicators may be a graphical icon or a text indicator and may be displayed beside each contact in the contacts list or may be accessible by a user, such as by accessing an individual contact entry for more information about the contact. Communication relationship patterns may be represented by a curve, such as the curve of FIG. 4. The user interface 314 may optimize a user's contacts list and display the list in an ordering determined based upon communication relationship patterns. Further, for incoming communication events, the user interface 314 may be configured to display an indication of the communication relationship pattern along with an identification of the initiating user or remote device 304. The user interface 314 may also be configured to annunciate an incoming communication event based on the communication relationship pattern with the initiating user or remote device. In this regard, the user interface 314 may annunciate incoming communications with a ringing tone associated with the appropriate communication relationship pattern. The user interface 314 may further allow a user of a user device 302 to define targeted communication relationship patterns for contacts and to audio/visually alert users of current status of the communication relationship pattern and advise users when such communication relationship patterns fall outside target ranges and of any actions that may be taken to rectify the communication relationship pattern.

Figure 6:
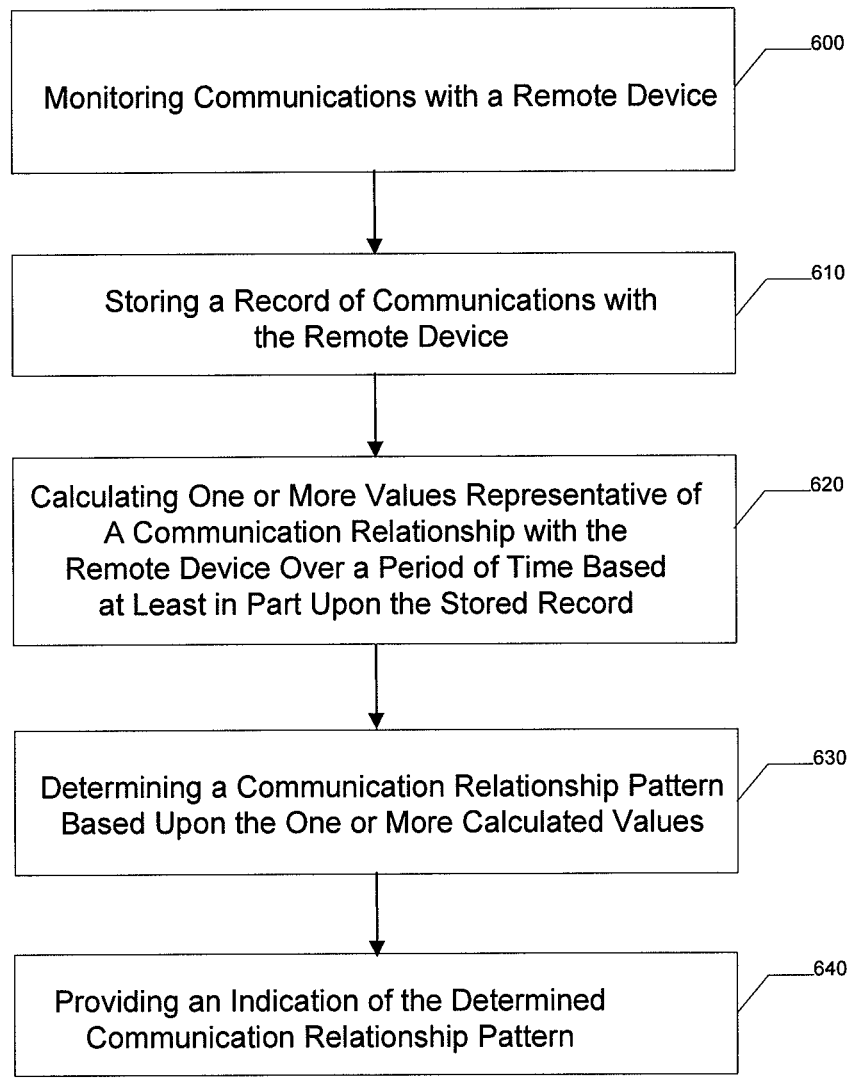
FIG. 6 is a flowchart according to an exemplary method for analyzing communication relationships according to an exemplary embodiment of the present invention.

FIG. 6 is a flowchart of a system, method, and computer program product according to an exemplary embodiment of the invention. It will be understood that each block or step of the flowchart, and combinations of blocks in the flowchart, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer instructions.

In this regard, one exemplary method for analyzing communication relationships according to an exemplary embodiment of the present invention is illustrated in FIG. 6. The method may include the communication monitoring unit 316 monitoring communications with a remote device at operation 600. Operation 610 may comprise the communication monitoring unit 316 storing a record of communications with the remote device. The communication behavior determination unit 318 may then calculate one or more values representative of a communication relationship with the remote device over a period of time based at least in part upon the stored record at operation 620. Operation 630 may then comprise the communication behavior determination unit 318 determining a communication relationship pattern based upon the one or more calculated values. Operation 640 may comprise the user interface 314 providing an indication of the determined communication relationship pattern.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user of a computing device, such as a mobile terminal 10. Embodiments of the invention may provide for analyzing communication relationships between a user of a computing device and users of remote computing devices. Accordingly, a user of a computing device may be able to easily monitor communication relationships with his contacts so as to maintain an optimum communication relationship with the contacts.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:

calculating one or more values representative of a communication relationship with a remote device over a period of time based at least in part upon a stored record of communications with the remote device, wherein at least one of the one or more values comprises a length of time between the time of a rejected communication event received from the remote device and a time at which a return communication event is directed to the remote device;

determining, by a processor, a communication relationship pattern based at least in part upon the one or more calculated values;

determining whether the determined communication relationship pattern falls outside of a target communication relationship pattern defined for the remote device or a user of the remote device;

causing an indication to be provided in an instance in which it is determined that the determined communication relationship pattern falls outside of the target communication relationship pattern;

in an instance in which a communication is received from the remote device, determining an annunciation to provide based at least in part upon the determined communication relationship pattern and causing the determined annunciation to be provided as an annunciation of the communication received from the remote device, wherein the determined annunciation is provided even in an instance in which the determined communication pattern falls outside of the target communication relationship pattern; and causing an indication of the determined communication relationship pattern to be displayed on a display, wherein causing an indication of the determined relationship pattern to be displayed comprises causing a contact representing the remote device to be displayed in a position in a contacts list defined based on the determined communication relationship pattern.

2. A method according to claim 1, wherein calculating one or more values representative of a communication relationship comprises one or more of:

calculating an intensity value representative of an intensity of communications with the remote device over a period of time;

calculating a balance value between outgoing and incoming communications with the remote device over a period of time; or calculating a communication relationship behavior value based at least in part upon the intensity and balance values.

3. A method according to claim 2, wherein calculating an intensity value comprises calculating a length of time based at least in part upon a total length of phone calls with the remote device over the period of time added to a number of messages exchanged with the remote device over the period of time multiplied by a time constant.

4. A method according to claim 2, wherein calculating a balance value comprises adding a first ratio of outgoing to incoming phone calls with the remote device multiplied by a first constant to a second ratio of outgoing to incoming messages exchanged with the remote device multiplied by a second constant.

5. A method according to claim 1, wherein the determined communication relationship pattern comprises one of equal and frequent communication, equal and infrequent communication, active and frequent communication, active and infrequent communication, passive and frequent communication, or passive and infrequent communication.

6. A method according to claim 1, wherein the communications with the remote device comprises phone calls, short message service (SMS) messages, multimedia messaging service (MMS) messages, instant messages(IM), e-mails, or file sharing.

7. A method according to claim 1, wherein the record of communications comprises a listing of communications with the remote device for each type of communication exchanged with the remote device, wherein each listing comprises one or more of records of communication events along with associated information about the communication events.

8. A method according to claim 1, wherein the record of communications comprises a database comprising indications of communication times and indications of whether communications were incoming or outgoing.

9. A method according to claim 1, wherein causing annunciation of the communication received from the remote device comprises causing annunciation of the communication received from the remote device with a ringing tone associated with the determined communication relationship pattern.

10. A method according to claim 1, wherein causing annunciation of the communication received from the remote device comprises causing display of an indication of the determined communication relationship pattern along with an identification of one or more of the remote device or a user of the remote device as a notification of the communication received from the remote device.

11. A method according to claim 1, further comprising, in an instance in which it is determined that the determined communication relationship pattern falls outside of the target communication relationship pattern:

determining an action that may be taken to help restore the determined communication relationship pattern to the target communication relationship pattern; and causing the determined action to be provided as a suggestion.

12. A method according to claim 2, wherein determining the communication relationship pattern comprises determining the communication relationship pattern further based on a first value defined as the average intensity value for all contacts and at least one second value defined as an average balance value for a plurality of contacts in addition to the one or more calculated values representative of the communication relationship with the remote device.

13. A computer program product comprising at least one non-transitory computer-readable storage medium having computer-readable program code portions stored therein, the computer-readable program code portions comprising:

a program code portion configured to calculate one or more values representative of a communication relationship with a remote device over a period of time based at least in part upon a stored record of communications with the remote device, wherein at least one of the one or more values comprises a length of time between the time of a rejected communication event received from the remote device and a time at which a return communication event is directed to the remote device;

a program code portion configured to determine a communication relationship pattern based at least in part upon the one or more calculated values;

a program code portion configured to determine whether the determined communication relationship pattern falls outside of a target communication relationship pattern defined for the remote device or a user of the remote device;

a program code portion configured to cause an indication to be provided in an instance in which it is determined that the determined communication relationship pattern falls outside of the target communication relationship pattern;

a program code portion configured, in an instance in which a communication is received from the remote device, to determine an annunciation to provide based at least in part upon the determined communication relationship pattern and causing the determined annunciation to be provided as an annunciation of the communication received from the remote device, wherein the determined annunciation is provided even in an instance in which the determined communication pattern falls outside of the target communication relationship pattern; and a program code portion configured to cause an indication of the determined communication relationship pattern to be displayed on a display, wherein the program code portion configured to cause an indication of the determined relationship pattern to be displayed comprises a program code portion configured to cause a contact representing the remote device to be displayed in a position in a contacts list defined based on the determined communication relationship pattern.

14. A computer program product according to claim 13, wherein the program code portion configured to calculate includes instructions configured to one or more of:
   calculate an intensity value representative of an intensity of communications with the remote device over a period of time;
   calculate a balance value between outgoing and incoming communications with the remote device over a period of time; or
   calculate a communication relationship behavior value based at least in part upon the intensity and balance values.

15. A computer program product according to claim 13, wherein the determined communication relationship pattern comprises one of equal and frequent communication, equal and infrequent communication, active and frequent communication, active and infrequent communication, passive and frequent communication, or passive and infrequent communication.

16. An apparatus comprising at least one processor and at least one memory storing computer program code, wherein the at least one memory and stored computer program code are configured, with the at least one processor, to cause the apparatus to at least:
   calculate one or more values representative of a communication relationship with a remote device over a period of time based at least in part upon a stored record of communications with the remote device, wherein at least one of the one or more values comprises a length of time between the time of a rejected communication event received from the remote device and a time at which a return communication event is directed to the remote device;
   determine a communication relationship pattern based at least in part upon the one or more calculated values;
   determine whether the determined communication relationship pattern falls outside of a target communication relationship pattern defined for the remote device or a user of the remote device;
   cause an indication to be provided in an instance in which it is determined that the determined communication relationship pattern falls outside of the target communication relationship pattern;
   in an instance in which a communication is received from the remote device, cause annunciation of the communication received from the remote device based at least in part upon the determined communication relationship pattern; and
   cause an indication of the determined communication relationship pattern to be displayed on a display, wherein causing an indication of the determined relationship pattern to be displayed comprises causing a contact representing the remote device to be displayed in a position in a contacts list defined based on the determined communication relationship pattern.

17. An apparatus according to claim 16, wherein the at least one memory and stored computer program code are configured, with the at least one processor to cause the apparatus to calculate one or more values by calculating one or more of:
   an intensity value representative of an intensity of communications with the remote device over a period of time;
   a balance value between outgoing and incoming communications with the remote device over a period of time; or
   calculating a communication relationship behavior value based at least in part upon the intensity and balance values.

18. An apparatus according to claim 17, wherein the at least one memory and stored computer program code are configured, with the at least one processor to cause the apparatus to calculate an intensity value by calculating a length of time based at least in part upon a total length of phone calls with the remote device over the period of time added to a number of messages exchanged with the remote device over the period of time multiplied by a time constant.

19. An apparatus according to claim 17, wherein the at least one memory and stored computer program code are configured, with the at least one processor to cause the apparatus to calculate a balance value by adding a first ratio of outgoing to incoming phone calls with the remote device multiplied by a first constant to a second ratio of outgoing to incoming messages exchanged with the remote device multiplied by a second constant.

20. An apparatus according to claim 16, wherein the determined communication relationship pattern comprises one of equal and frequent communication, equal and infrequent communication, active and frequent communication, active and infrequent communication, passive and frequent communication, or passive and infrequent communication.

21. An apparatus according to claim 16, wherein the communications with the remote device comprises phone calls, short message service (SMS) messages, multimedia messaging service (MMS) messages, instant messages(IM), e-mails, or file sharing.

22. An apparatus according to claim 16 wherein the record of communications comprises a listing of communications with the remote device for each type of communication exchanged with the remote device, wherein each listing comprises one or more of records of communication events along with associated information about the communication events.

23. An apparatus according to claim 16 wherein the record of communications comprises a database comprising indications of communication times and indications of whether communications were incoming or outgoing.

24. An apparatus according to claim 16, wherein the apparatus comprises or is embodied on a mobile phone, the mobile phone comprising a user interface configured to:
   facilitate user control of at least some functions of the mobile phone through use of a display; and
   cause at least a portion of a user interface of the mobile phone to be displayed on the display to facilitate user control of at least some functions of the mobile phone.

25. An apparatus comprising:
   means for calculating one or more values representative of a communication relationship with a remote device over a period of time based at least in part upon a stored record of communications with the remote device, wherein at least one of the one or more values comprises a length of time between the time of a rejected communication event received from the remote device and a time at which a return communication event is directed to the remote device;
   means for determining a communication relationship pattern based at least in part upon the one or more calculated values, wherein at least one of the one or more values comprises a length of time between the time of a rejected communication event received from the remote device and a time at which a return communication event is directed to the remote device;

means for determining whether the determined communication relationship pattern falls outside of a target communication relationship pattern defined for the remote device or a user of the remote device;

means for causing an indication to be provided in an instance in which it is determined that the determined communication relationship pattern falls outside of the target communication relationship pattern;

means for, in an instance in which a communication is received from the remote device, determining an annunciation to provide based at least in part upon the determined communication relationship pattern and causing the determined annunciation to be provided as an annunciation of the communication received from the remote device, wherein the determined annunciation is provided even in an instance in which the determined communication pattern falls outside of the target communication relationship pattern; and means for causing an indication of the determined communication relationship pattern to be displayed on a display, wherein means for causing an indication of the determined relationship pattern to be displayed comprises means for causing a contact representing the remote device to be displayed in a position in a contacts list defined based on the determined communication relationship pattern.

* * * * *